(No Model.) 3 Sheets—Sheet 1.
A. WOOLSEY.
ROAD SCRAPER.
No. 312,313. Patented Feb. 17, 1885.
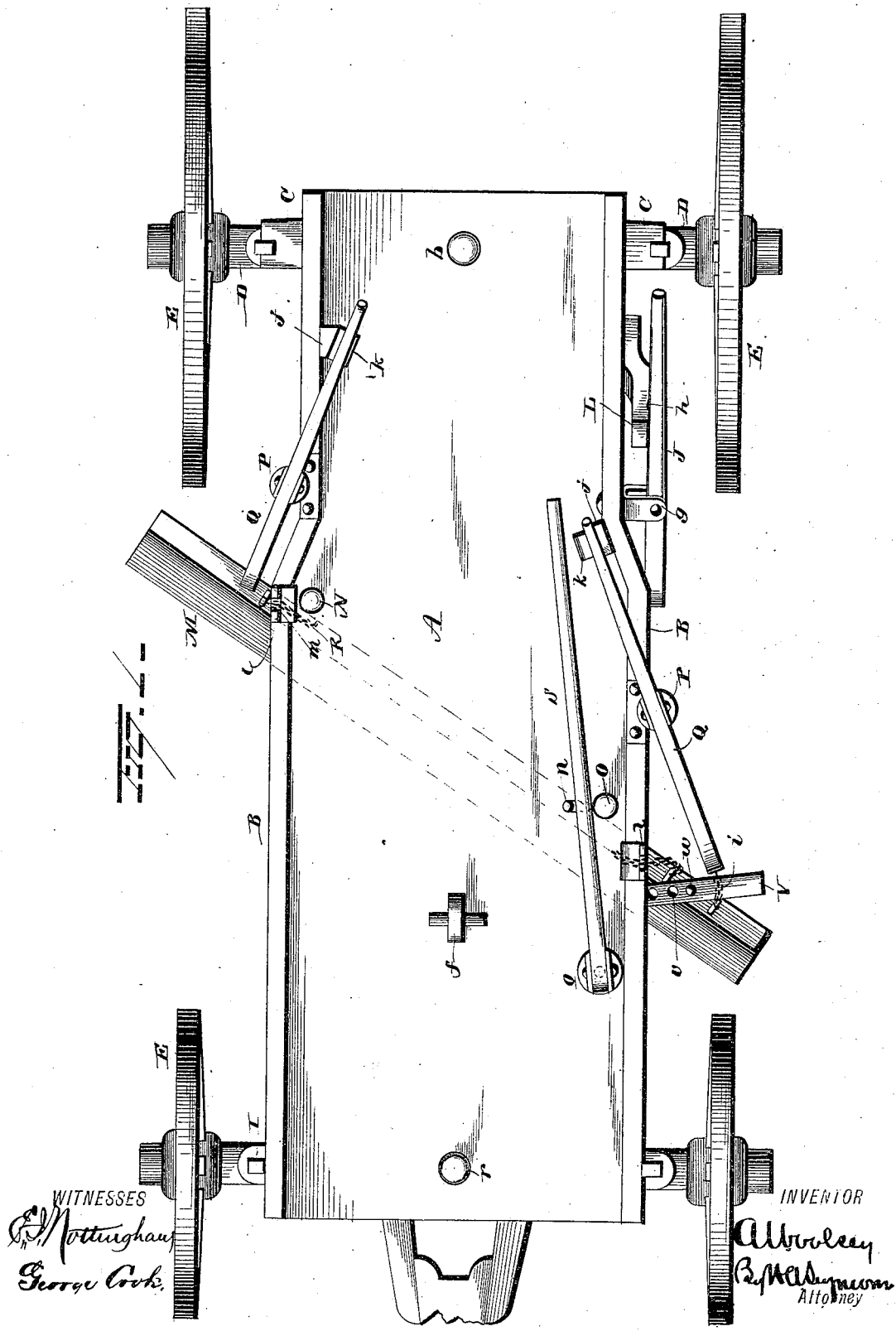
WITNESSES
E. J. Nottingham
George Cook.
INVENTOR
A. Woolsey
By H. A. Seymour
Attorney

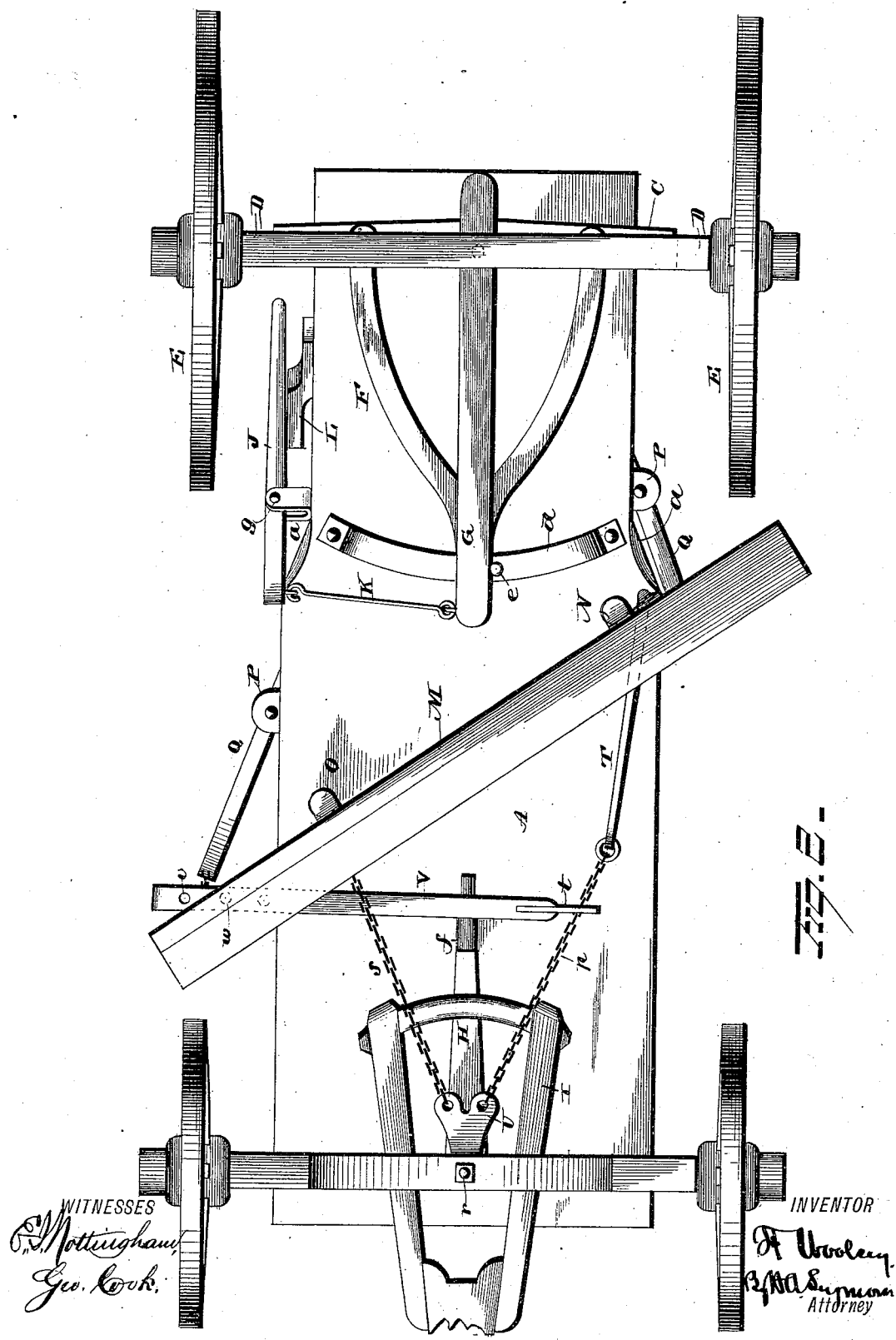

(No Model.) 3 Sheets—Sheet 3.
A. WOOLSEY.
ROAD SCRAPER.
No. 312,313. Patented Feb. 17, 1885.
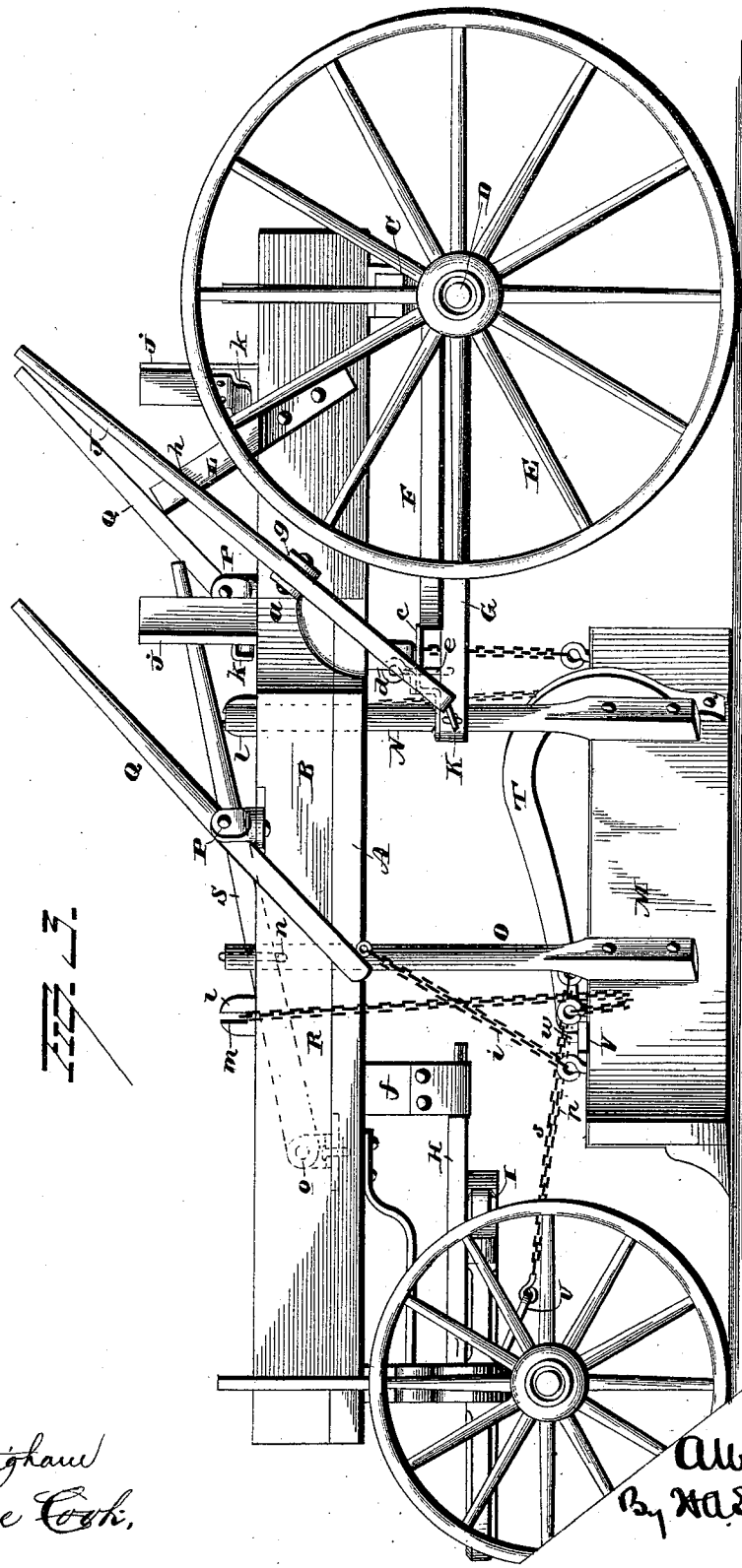
WITNESSES
INVENTOR

UNITED STATES PATENT OFFICE.

ALANSON WOOLSEY, OF MADISON, MICHIGAN.

ROAD-SCRAPER.

SPECIFICATION forming part of Letters Patent No. 312,313, dated February 17, 1885.

Application filed February 1, 1884. (No model.)

*To all whom it may concern:*

Be it known that I, ALANSON WOOLSEY, of Madison, in the county of Lenawee and State of Michigan, have invented certain new and useful Improvements in Road-Scrapers; and I do hereby declare the following to be a full, clear, and exact description of the invention, such as will enable others skilled in the art to which it appertains to make and use the same.

My invention relates to an improvement in road-scrapers, the object being to so construct the body of the scraper and so mount the same that it will turn in a very small circle, thus adapting the same to be readily turned on a narrow road. A further object is to provide improved means for keeping the scraper down on the ground when passing over a hard or rough surface. Another object is to provide a scraper which shall be simple and economical in construction and at the same time durable and efficient in use; and with these ends in view my invention consists in certain novel features of construction and combination of parts, as will be hereinafter fully described, and pointed out in the claims.

In the accompanying drawings, Figure 1 is a top plan view of a road-scraper embodying my improvement. Fig. 2 is a reverse plan view, and Fig. 3 is a view in side elevation.

A represents the bed of the wagon, and B the sides thereof. The rear ends of the bed or bottom A are cut away, as shown at $a$, and the sides B bent to conform therewith. The rear end of the bed A is secured to the bolster C by means of the king-bolt $b$, said bolster C being rigidly secured to the axle D, to which latter are journaled the wheels E.

To the axle D, or between the axle and bolster, are rigidly secured the hounds F, and also the short reach-bar G, the forward end of which latter extends somewhat in front of the hounds F, and is provided with the bearing-plate $c$, adapted, when the wheels are turned at an angle with the bed A, to slide on the under side of the friction-plate $d$, secured to the under face of the said bed A.

To the plate $d$, and to one side of the center thereof, is secured a stop or projection, $e$, against which the reach-bar G strikes when the wheels have been turned at a certain angle with the bed of the wagon. The forward end of the wagon is mounted in the ordinary manner, the rear end of the reach-bar H being held stationary by the depending arm $f$, secured to the bed A. The hounds I are secured between the axle and bolster and bear on the under side of the reach-bar H when the wheels are turned at an angle with the wagon-body. It will be seen from this construction that the wagon may be turned in a very short space, both the rear and forward wheel being allowed to turn at an angle with the wagon-body, and by cutting away the rear portion of the latter, as described, the rear wheels are allowed a greater distance to turn, thus also decreasing the space required for the wagon to turn in.

J is a lever pivotally secured in the clamp $g$, the latter being swiveled to the side of the wagon, and near the rear end thereof, the lower end of the lever J being connected to the reach-bar G by means of the pitman K. By pulling the upper end of the lever toward the wagon the reach-bar will move in the opposite direction and turn the wheels accordingly. The lever is held in a stationary position, when not in use, by means of the recess $h$, formed in the standard L, secured to the side of the wagon. The lever is adapted to extend above the sides of the wagon and within easy reach of the operators. By means of this lever the rear wheels may be easily and readily turned, and when not in use it may be turned down out of the way in the recess $b$, holding the wheels in line with the wagon-body.

M represents the scraper, to the rear side of which are secured the vertical posts N O, extending up through the bed A of the wagon, said scraper being of any desired construction.

To the sides of the wagon are swiveled the clamps P, in which are pivotally secured the levers Q, the forward ends of which are connected to the scraper by means of the chains $i$ or their equivalents. These levers may be operated simultaneously or independently, thereby raising the whole scraper or each end independently, according to the dictate of circumstances.

To the sides of the wagon are secured the upright pieces j, to the inner sides of which are secured the depending catches k, beneath which are placed the free ends of the levers when it is desired to hold the scraper clear of the ground.

On the upper edge of the sides of the wagon are secured the catches l, provided with the vertical slots m, adapted to receive the chains R, secured to the upper edge of the scraper. The links composing the chains are each formed with their ends bent into loops in planes at right angles with each other, so that when inserted in the said slots they are prevented from pulling out of the same. By these means the scraper may be adjusted and retained at any suitable height, it being first raised to the desired height by the levers Q, and then secured in that position by means of the chains R and slotted catches l.

To the post O is secured the hook n, formed in the shape of an S, the upper arm being secured to the said post, the lower curved portion being adapted to receive the lever S, the lower forward end of which is pivotally secured to the clamp o, swiveled to the bed A, near the forward end thereof. By bearing down on the free end of this lever the scraper is kept firmly on the ground. This device is specially adapted for use when the scraper is working on a hard or rough surface, where it becomes necessary to keep the scraper down in order to perform its functions. When the lever is not in use, it may be lifted out of the hook n and laid on the floor or bed of the wagon, out of the way of the operator.

To the lower rear edge of the scraper is pivotally secured the bent metal bar T, which is curved upwardly over the top of the scraper and toward the front of the wagon. To the forward end of this rod is secured the chain p, the opposite end of which latter is secured to the one end of the bifurcated plate U, through which plate passes the king-bolt r. Near the opposite end of the scraper is secured the chain s, which latter is also attached to one end of the plate U.

V represents the spreader-bar, provided on its front end with metallic plate t, provided with a slot adapted to receive the chain p, the latter being formed similar to the chain R. The opposite end of the spreader-bar is provided with a series of perforations, v, in which is adapted to fit a pin or projection, w, formed on or secured to the upper edge of the scraper. The bar V, when placed in position between the chain and scraper-bar, carries the former slightly out of a direct line, and hence when the scraper comes in contact with the earth a portion of the strain on the chain p is transmitted through the bar V to the upper edge of the scraper and forces the upper edge of the scraper rearwardly, while the beam T, which is also connected to the chain p and to scraper-bar near its lower edge, forces the lower edge of the scraper-bar forwardly. This arrangement of parts also tends to draw the rear end of the scraper forwardly and force the front end rearwardly, and by loosely securing the rod T to the lower rear edge of the scraper the draft comes on the lower side of the scraper.

My invention is exceedingly simple in construction, may be applied to any ordinary farm-wagon, is easily and readily operated, is of few parts, is durable and efficient in use, and can be manufactured at a small initial cost.

It is evident that many slight changes might be resorted to in the construction and relative arrangement of the different parts of my improvement without involving a departure from the spirit of my invention, and hence I would have it understood that I do not limit myself to the exact construction shown and described, but hold myself at liberty to make such changes as fairly fall within the spirit and scope of my invention.

Having fully described my invention, what I claim as new, and desire to secure by Letters Patent, is—

1. In a road-scraper, the combination, with a bed and front wheels, of rear wheels mounted on an axle pivotally secured to said bed, an arm rigidly secured to the axle, a lever pivoted to the side of the wagon body or bed, and a pitman connecting the lower end of the lever and the free end of the arm, substantially as set forth.

2. In a road-scraper, the combination, with the bed cut away at its rear end, of front and rear wheels pivotally secured thereto, and a lever pivotally secured to the side of the bed or wagon-body and indirectly connected with the rear axle, thereby adapting said lever to turn the rear wheels at an angle with the wagon-body, substantially as set forth.

3. In a road-scraper, the combination, with the wagon-bed, of front and rear wheels secured thereto, a lever pivotally secured to one side of the wagon and indirectly connected with the rear axle, and a standard secured to one side of the wagon-body, and provided with a recess to receive the lever and hold the same in a locked position, substantially as set forth.

4. The combination, with a wagon-body mounted on wheels, a scraper, and posts rigidly secured at their lower ends to the scraper and passing upwardly through the body of the wagon, of levers Q, pivotally secured in swiveled bearings, chains connecting the levers and scraper, the chains p and s, and the beam T, substantially as set forth.

5. The combination, with the wagon-body, the scraper, and posts connected to the scraper and passing upwardly through the body, of the lever or levers swiveled to the body, and adapted to bear on projecting hooks of the posts, the slotted catches, and the chains secured to the scraper and engaging the catches, substantially as set forth.

6. In a road-scraper, the combination, with the wagon-body, the rear portion of which is cut away, of front and rear wheels pivotally secured thereto, a lever, J, reach-bar G, and pitman K, all of the above parts being combined and adapted to operate substantially as set forth.

7. In a road-scraper, the combination, with the wagon-body, of a scraper secured to posts N O, bar T, chains $p$ $s$, plate U, chains R, catches $l$, and levers Q, connected with the scraper by means of chains $i$, all of the above parts combined and adapted to operate substantially as set forth.

In testimony whereof I have signed this specification in the presence of two subscribing witnesses.

ALANSON WOOLSEY.

Witnesses:
C. R. MILLER,
S. SIMON.